US010556276B2

(12) United States Patent
Mason (10) Patent No.: US 10,556,276 B2
(45) Date of Patent: Feb. 11, 2020

(54) LOCKING CHUCK (71) Applicant: Apex Brands, Inc., Sparks, MD (US)

(72) Inventor: Neil Mason, Newcastle upon tyne (GB)

(73) Assignee: APEX BRANDS, INC., Apex, NC (US)

( * ) Notice: Subject to any disclaimer, the term of this patent is extended or adjusted under 35 U.S.C. 154(b) by 890 days.

(21) Appl. No.: 13/826,690

(22) Filed: Mar. 14, 2013

(65) Prior Publication Data

US 2014/0265163 A1    Sep. 18, 2014

(51) Int. Cl.
*B23B 31/12* (2006.01)

(52) U.S. Cl.
CPC ........ *B23B 31/123* (2013.01); *B23B 31/1238* (2013.01); *Y10T 279/17632* (2015.01)

(58) Field of Classification Search
CPC .............. B23B 31/123; B23B 31/1238; Y10T 279/17632
USPC ...................................... 279/60–65
See application file for complete search history.

(56) References Cited

U.S. PATENT DOCUMENTS

| | | |
|---|---|---|
| 573,189 A | 12/1896 | Vogel |
| 1,410,080 A | 3/1922 | Schwahlen |
| 2,684,856 A | 7/1954 | Stoner |
| 3,237,955 A | 3/1966 | McCarthy et al. |
| 3,325,166 A | 6/1967 | McCarthy et al. |
| 3,506,277 A | 4/1970 | Harms |
| 3,545,776 A | 12/1970 | Haviland |
| 3,970,323 A | 7/1976 | Schnizler, Jr. |
| 4,277,074 A | 7/1981 | Kilberis |
| 4,317,578 A | 3/1982 | Welch |
| 4,358,230 A | 11/1982 | Rohlin |
| 4,395,170 A | 7/1983 | Clarey |
| 4,491,445 A | 1/1985 | Hunger et al. |
| 4,498,682 A | 2/1985 | Glore |
| 4,526,497 A | 7/1985 | Hatfield |
| 4,536,113 A | 8/1985 | Hatfield |
| 4,621,820 A | 11/1986 | Rohm |
| 4,627,626 A | 12/1986 | Rohm |
| 4,627,627 A | 12/1986 | Rohm |
| 4,627,628 A | 12/1986 | Rohm |
| 4,655,464 A | 4/1987 | Manschitz et al. |
| 4,660,841 A | 4/1987 | Chouinard |
| 4,669,932 A | 6/1987 | Hartley |
| 4,682,918 A | 7/1987 | Palm |
| 4,695,065 A | 9/1987 | Komatsu et al. |
| 4,695,066 A | 9/1987 | Rohm |

(Continued)

*Primary Examiner* — Eric A. Gates
*Assistant Examiner* — Paul M Janeski
(74) *Attorney, Agent, or Firm* — Burr & Forman, LLP (57) ABSTRACT

A chuck includes a body having a nose section with an axial bore and a plurality of passageways formed therein, and a plurality of jaws disposed in the passageways. A nut for driving the jaws is rotatably mounted about the body and a sleeve defining a first recess and a second recess is rotatable with respect to the nut between a first rotational position and a second rotational position. An array of locking teeth is fixed to the body and a pawl member with an engagement portion is non-rotatably fixed to the nut. The engagement portion is received in the second recess and engages the locking teeth when the sleeve is in the second rotational position, the engagement portion being compressed so that an amount of force is exerted on the nut in the closing direction by the engagement portion.

18 Claims, 8 Drawing Sheets

(56) References Cited

U.S. PATENT DOCUMENTS

| | | |
|---|---|---|
| 4,700,956 A | 10/1987 | Rohm |
| 4,703,941 A | 11/1987 | Rohm |
| 4,703,942 A | 11/1987 | Rohm |
| 4,773,657 A | 9/1988 | Rohm |
| 4,824,298 A | 4/1989 | Lippacher et al. |
| 4,840,387 A | 6/1989 | McCarthy |
| 4,844,482 A | 7/1989 | Rohm |
| 4,848,779 A | 7/1989 | Wheeler et al. |
| 4,930,793 A | 6/1990 | Ando |
| 4,951,955 A | 8/1990 | Sakamaki |
| 4,958,840 A | 9/1990 | Palm |
| 4,968,191 A | 11/1990 | Palm |
| 5,009,439 A | 4/1991 | Sakamaki |
| 5,031,925 A | 7/1991 | Tatsu et al. |
| 5,044,643 A | 9/1991 | Nakamura |
| 5,125,673 A | 6/1992 | Huff et al. |
| 5,145,192 A | 9/1992 | Rohm |
| 5,145,193 A | 9/1992 | Rohm |
| 5,145,194 A | 9/1992 | Huff et al. |
| 5,174,588 A | 12/1992 | Reibetanz et al. |
| 5,183,274 A | 2/1993 | Sakamaki |
| 5,195,760 A | 3/1993 | Wheeler et al. |
| 5,232,230 A | 8/1993 | Lin |
| 5,234,223 A | 8/1993 | Sakamaki |
| 5,348,317 A | 9/1994 | Steadings et al. |
| 5,375,857 A | 12/1994 | Rohm |
| 5,375,858 A | 12/1994 | Rohm |
| 5,458,345 A | 10/1995 | Amyot |
| 5,741,016 A | 4/1998 | Barton et al. |
| 5,765,839 A * | 6/1998 | Rohm ................ B23B 31/1215 279/140 |
| 5,829,761 A | 11/1998 | Rohm |
| 5,957,469 A | 9/1999 | Miles et al. |
| 6,341,783 B1 | 1/2002 | Rohm |
| 6,390,481 B1 | 5/2002 | Nakamuro |
| 6,659,474 B2 * | 12/2003 | Sakamaki et al. ............. 279/62 |
| 7,497,444 B2 * | 3/2009 | Sakamaki et al. ............. 279/62 |
| 2002/0089127 A1 * | 7/2002 | Rohm ................ B23B 31/123 279/62 |
| 2003/0042692 A1 * | 3/2003 | Sakamaki et al. ............. 279/62 |
| 2003/0071425 A1 * | 4/2003 | Lin ..................... B23B 31/123 279/62 |
| 2005/0087937 A1 * | 4/2005 | Zhou .................. B23B 31/123 279/62 |
| 2005/0258605 A1 * | 11/2005 | Tan .................... B23B 31/123 279/62 |
| 2006/0273529 A1 * | 12/2006 | Zhou .................. B23B 31/123 279/62 |
| 2006/0279048 A1 * | 12/2006 | Gong ................. B23B 31/1238 279/62 |
| 2010/0127464 A1 * | 5/2010 | Mack ............................ 279/62 |

* cited by examiner

LOCKING CHUCK

FIELD OF THE INVENTION

The present invention relates generally to chucks for use with drills or with electric or pneumatic power drivers. More particularly, the present invention relates to a chuck of the keyless type which may be tightened or loosened by hand or actuation of the driver motor.

BACKGROUND OF THE INVENTION

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws which are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Various configurations of keyless chucks are known in the art and are desirable for a variety of applications.

The present invention recognizes and addresses the foregoing considerations, and others, of prior art constructions and methods.

SUMMARY OF THE INVENTION

One embodiment of the present disclosure provides a chuck for use with a manual or powered driver having a rotatable drive shaft, the chuck including a generally cylindrical body having a nose section and a tail section, the tail section being configured to rotate with the drive shaft and the nose section having an axial bore formed therein and a plurality of passageways formed therethrough and intersecting the axial bore. A plurality of jaws is movably disposed in the passageways and a nut is rotatably mounted about the body and in operative communication with the jaws so that rotation of the nut in a closing direction moves the jaws toward the axis of the axial bore and rotation of the nut in an opening direction moves the jaws away from the axis. A generally cylindrical sleeve is rotatably mounted about the body, the sleeve including an inner surface defining a first recess and a second recess, and the sleeve being in operative communication with the nut so that the sleeve rotationally drives the nut but is rotatable with respect to the nut between a first rotational position and a second rotational position. An annular array of locking teeth is non-rotatably fixed to the body, and a pawl member is non-rotatably fixed to the nut, the pawl member including an engagement portion having a convex outer surface and a concave inner surface disposed in facing relationship with the locking teeth. The engagement portion is radially movable with respect to the body, the engagement portion and the locking teeth being configured so that when the engagement portion engages the locking teeth, the engagement portion and the locking teeth prevent the nut from rotating in the opening direction with respect to the body. The engagement portion is received in the first recess and is disengaged from the locking teeth when the sleeve is in the first rotational position and the engagement portion is received in the second recess and engages the locking teeth when the sleeve is in the second rotational position, the engagement portion being compressed between the locking teeth and the second recess in the second rotational position so that an amount of force is exerted on the nut in the closing direction by the engagement portion.

Another embodiment of the present disclosure provides a chuck for use with a manual or powered driver having a rotatable drive shaft, the chuck including a generally cylindrical body having a nose section, a tail section and a center axis, the tail section being configured to rotate with the drive shaft and the nose section having an axial bore formed therein and a plurality of passageways formed therethrough and intersecting the axial bore. A plurality of jaws is movably disposed in the passageways and a nut is rotatably mounted about the body and in operative communication with the jaws so that rotation of the nut in a closing direction moves the jaws toward the center axis of the body and rotation of the nut in an opening direction moves the jaws away from the center axis. A generally cylindrical sleeve is rotatably mounted about the body, the sleeve including an inner surface defining a camming surface. The sleeve is in operative communication with the nut so that the sleeve rotationally drives the nut but is rotatable with respect to the nut between a first rotational position and a second rotational position. An annular array of locking teeth is non-rotatably fixed to the body and a locking pawl is non-rotatably fixed to the nut, the locking pawl being deflectable and including a curved engagement portion. The engagement portion is radially movable with respect to the body. The engagement portion and the locking teeth are configured so that when the engagement portion engages the locking teeth, the engagement portion and the locking teeth prevent the nut from rotating in the opening direction with respect to the body. The locking pawl has a first length when the sleeve is in the first rotational position and a second length when the sleeve is in the second rotational position, and the second length is greater than the first length. The camming surface biases the engagement portion of the locking pawl radially inwardly as the sleeve moves from the first rotational position to the second rotational position with respect to the nut.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Repeat use of reference characters in the present specification and drawings is intended to represent same or analogous features or elements of the drill chuck.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
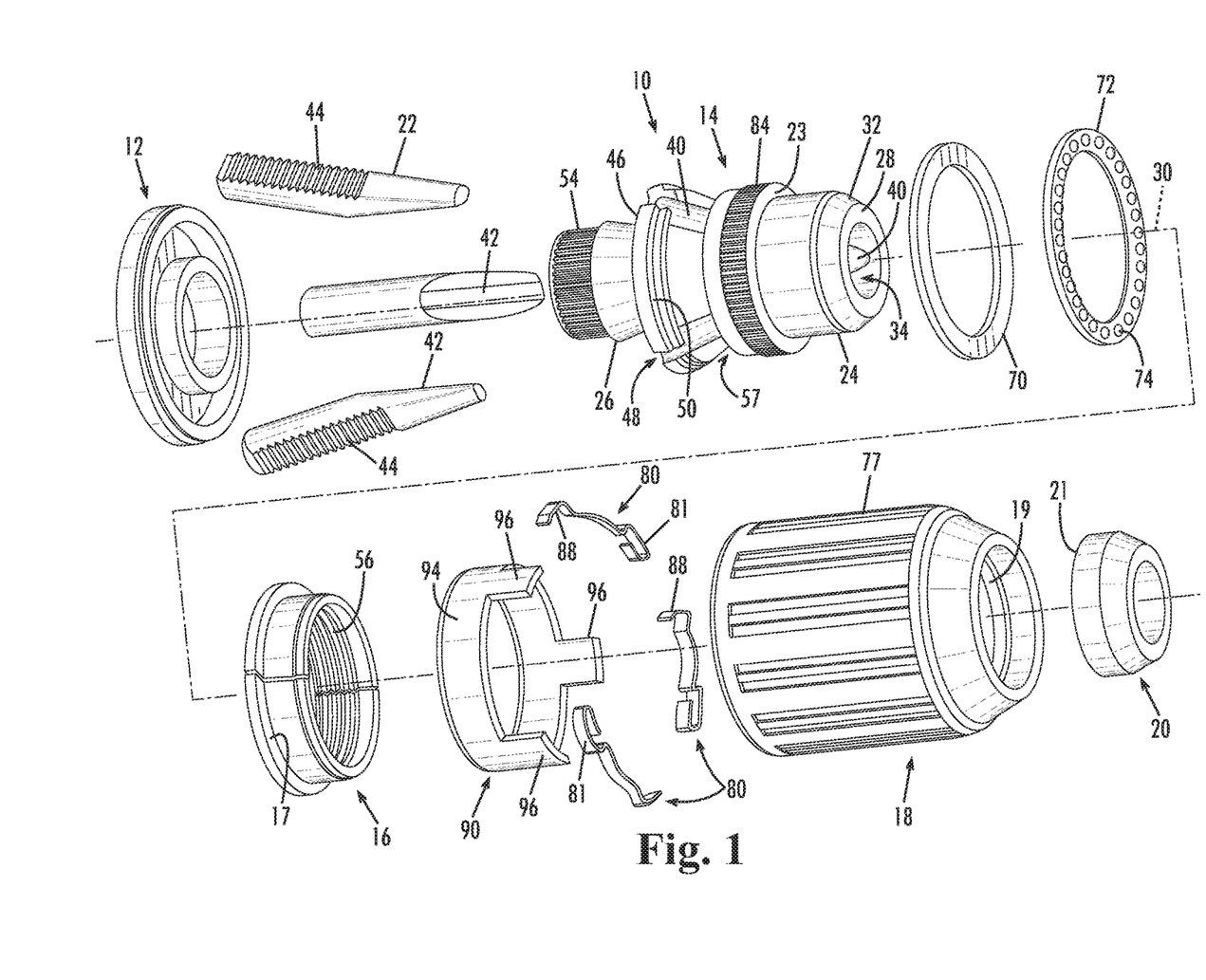
FIG. 1 is an exploded perspective view of a drill chuck in accordance with an embodiment of the present invention.
Figure 2:
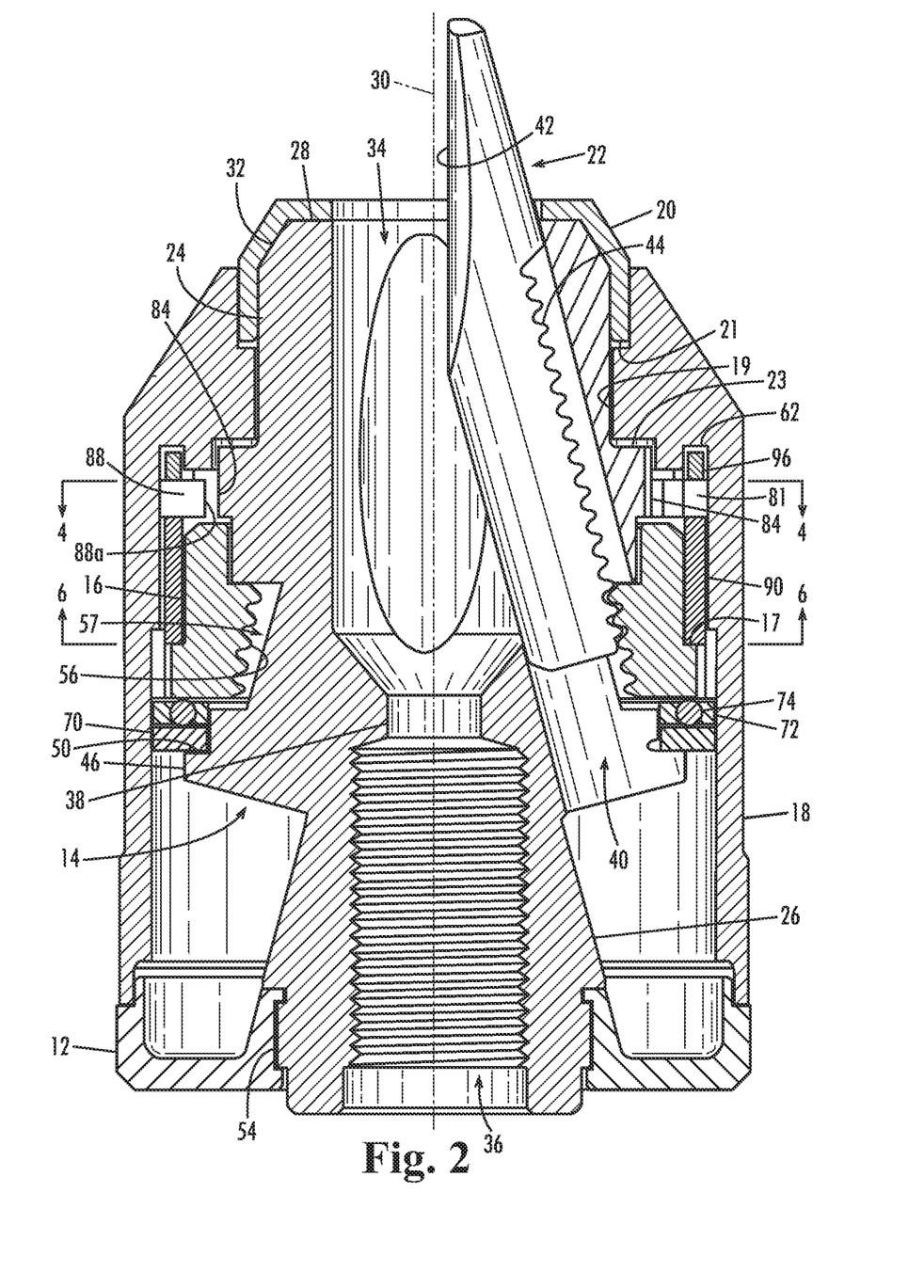
FIG. 2 is a longitudinal view, in cross section, of the drill chuck shown in FIG. 1.
Figure 3:
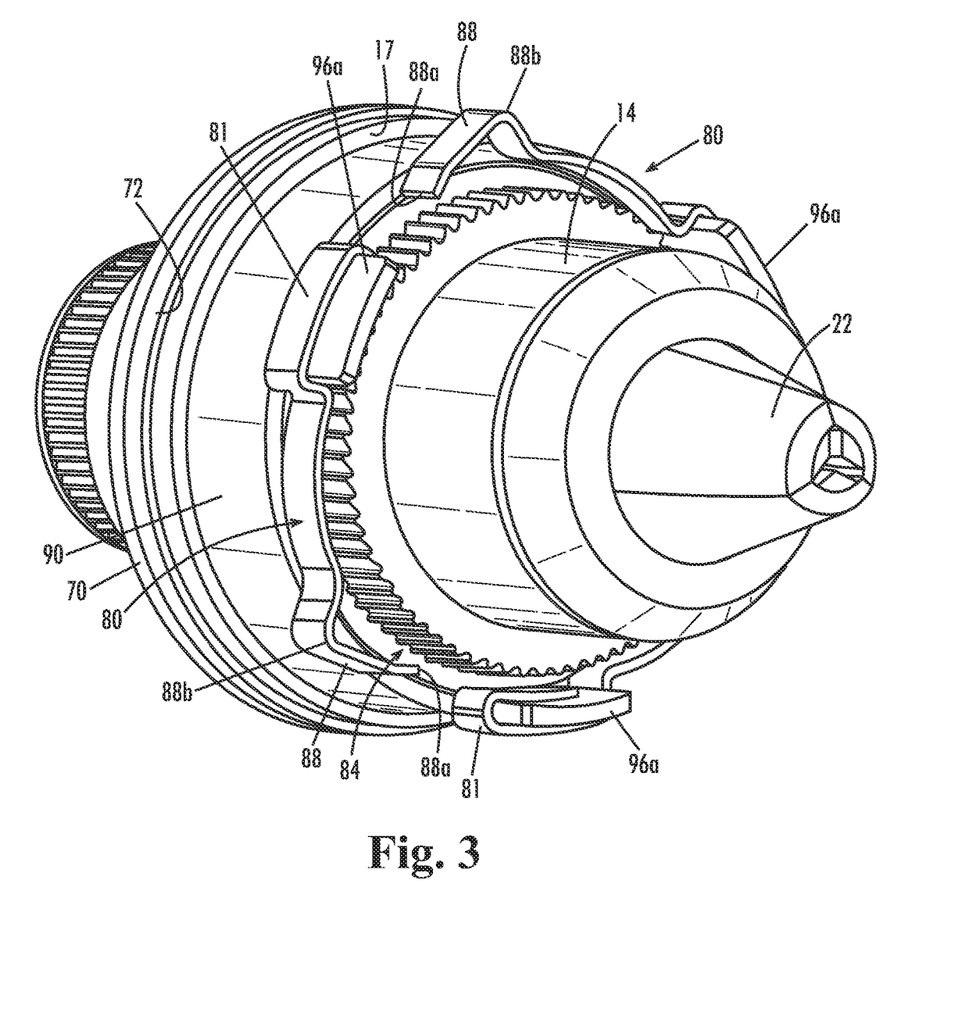
FIG. 3 is a partial perspective view of the chuck as shown in FIG. 1, showing the body, nut, nut retainer and locking pawls.

Referring to FIGS. 1 through 3, a chuck 10 in accordance with the present disclosure includes a body 14, a nut 16, a front sleeve 18, a nose piece 20, a dust cover 12 and a gripping mechanism including a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the tool is designed to accommodate. A threaded bore 36 is formed in tail section 26 and is of a standard size to mate with the drive shaft of a powered or hand driver (not shown). The bores 34, 36 may communicate at a central region 38 of body 14. While a threaded bore 36 is illustrated, such bore could be replaced with a tapered bore of a standard size to mate with a tapered drive shaft. Furthermore, body 14 may be formed integrally with the drive shaft.

Body 14 defines three passageways 40 to accommodate three jaws 22. Each jaw is separated from the adjacent jaw by an arc of approximately 120°. The axes of passageways 40 and jaws 22 are angled with respect to the chuck center axis 30 such that each passageway axis travels through axial bore 34 and intersects axis 30 at a common point ahead of the chuck body. The jaws form a grip that moves radially toward and away from the chuck axis to grip a tool, and each jaw 22 has a tool engaging face 42 generally parallel to the axis of chuck body 14. Threads 44, formed on the opposite or outer surface of each jaw 22, may be constructed in any suitable type and pitch.

As illustrated in FIGS. 1 and 2, body 14 includes a thrust ring 46 that, in a preferred embodiment, may be integral with the body. It should be understood, however, that thrust ring 46 and body 14 may be separate components. Thrust ring 46 includes a plurality of jaw guideways 48 formed around its circumference to permit retraction of jaws 22 therethrough and also includes a ledge portion 50 to receive a bearing assembly as described below.

Body tail section 26 includes a knurled surface 54 that receives dust cover rear sleeve 12 in a press fit. Dust cover 12 could also be retained by press fit without knurling, by use of a key or by crimping, staking, riveting, threading or any other suitable securing mechanism. Further, the chuck may be constructed with a single sleeve having no rear sleeve, for example, where the power driver to which the chuck is attached includes a spindle lock feature to enable actuation of the chuck by the single sleeve when the spindle is rotationally fixed by the spindle lock.

Nut 16, which in the preferred embodiment is a split nut, defines female threads 56 located on inner circumference of the nut and is received in a groove 57 formed in chuck body 14 proximate thrust ring member 46. Threads 56 are configured to mate with jaw threads 44. Nut 16 is positioned about the body in engagement with the jaw threads so that when the nut is rotated with respect to body 14, the jaws will be advanced or retracted depending on the rotational direction of nut 16. A bearing washer 70 and an annular bearing cage 72 are received between thrust ring 46 and nut 16. Bearing cage 72 holds a plurality of balls 74 that permits the nut to rotate relative to the chuck body.

As best seen in FIGS. 1 and 3, a nut retainer 90 includes a body portion 94 and a plurality of drive dogs 96 that depend axially outwardly from a front edge of body portion 94. Drive dogs 96 are configured to each receive a corresponding locking pawl 80 and interact with a corresponding recess 62 (FIG. 6) defined by the inner surface of front sleeve 18, as discussed in greater detail below. Body portion 94 of nut retainer 90 is received about split nut 16 in a press-fit, thereby retaining nut 16 in groove 57 of the chuck body and non-rotatably fixed nut retainer 90 to nut 16. Preferably, the rear edge of nut retainer's body portion 94 abuts an annular ledge 17 that depends radially outwardly from nut 16, thereby ensuring nut retainer 90 is in the desired axial position with respect to first sleeve 18 and body 14.

The outer circumferential surface of outer sleeve 18 may be knurled or may be provided with longitudinal ribs 77 or other protrusions to enable the operator to grip it securely. In like manner, the circumferential surface of dust cover 12, if employed, may be knurled or ribbed if desired. Nose piece 20 is press fit to body nose section 24 and retains front sleeve 18 against forward axial movement. More specifically, as best seen in FIG. 2, an annular ledge 19 depends radially inwardly from the inner surface of front sleeve 18 adjacent its front end. Annular ledge 19 is rotatably received in a gap found between the rear edge 21 of nose piece 20 and forwardly facing ledge 23 of body 14. It should be understood, however, that other methods of axially securing the nut on the body may be used. Nose piece 20 may be coated with a non-ferrous metallic coating to prevent rust and to enhance its appearance. Examples of suitable coatings include zinc or nickel, although it should be appreciated that any suitable coating could be utilized.

Front sleeve 18 and dust cover 12 may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials for which the chuck of the present disclosure is fabricated will depend on the end use of the chuck, and the above materials are provided by way of example only.

Figure 6:
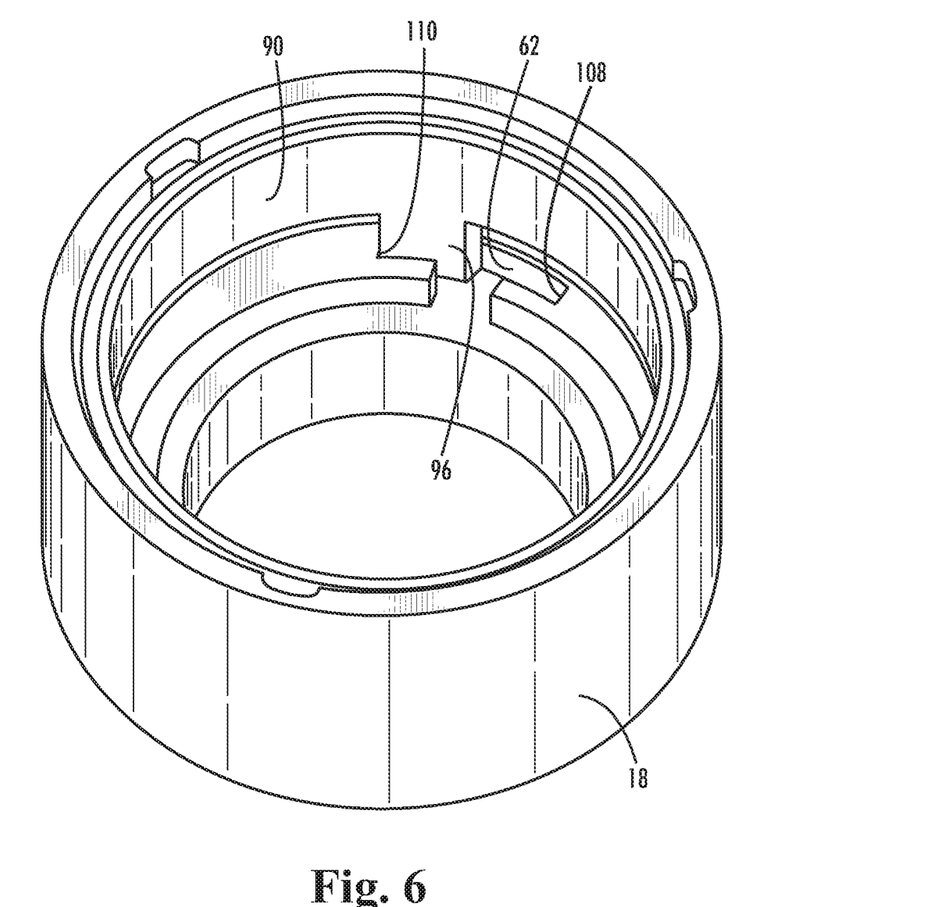
FIG. 6 is a partial, perspective view of the sleeve and nut retainer of the chuck shown in FIG. 1.

As previously noted, the inner surface of front sleeve 18 includes recesses 62 that receive respective drive dogs 96 extending from the front edge of nut retainer 90. As shown in FIG. 6, the angular width of the drive dogs is less than that of the recesses, resulting in a slight range of relative rotational movement, for example between 6° and 10°, between the nut and the front sleeve. As best seen in FIG. 3, each drive dog 96 of nut retainer 90 has a deflectable locking pawl 80 mounted thereon. Each locking pawl 80 includes a proximal end, or mounting portion 81, a distal end, or engagement portion 88, and a central portion 86 extending therebetween. Engagement portion 88 includes a biasing cam 88b and a locking tip 88a. Biasing cam 88b is configured to slide along a corresponding camming surface 104 of front sleeve 18 and be received in either base 104a or locking recess 106 thereof, dependent upon whether front sleeve 18 is in a first rotational position or second rotational position, respectively, with respect to nut 16. Locking tip 88a of each locking pawl 80 is configured to selectively engage the annular array of locking teeth 84, thereby preventing unintentional loosening of the chuck, as discussed in greater detail below. Preferably, the length of each drive dog 96 in the axial direction is greater than the length of the corresponding mounting portion 81 in the axial direction. As such, a front portion 96a of each drive dog 96 extends outwardly beyond the mounting portion of the corresponding locking pawl 80 when the locking pawl is mounted thereto in a press-fit. It is only front portion 96a of each drive dog 96 that is slidably received in the corresponding recess 62 of front sleeve 18.

Figure 4A:
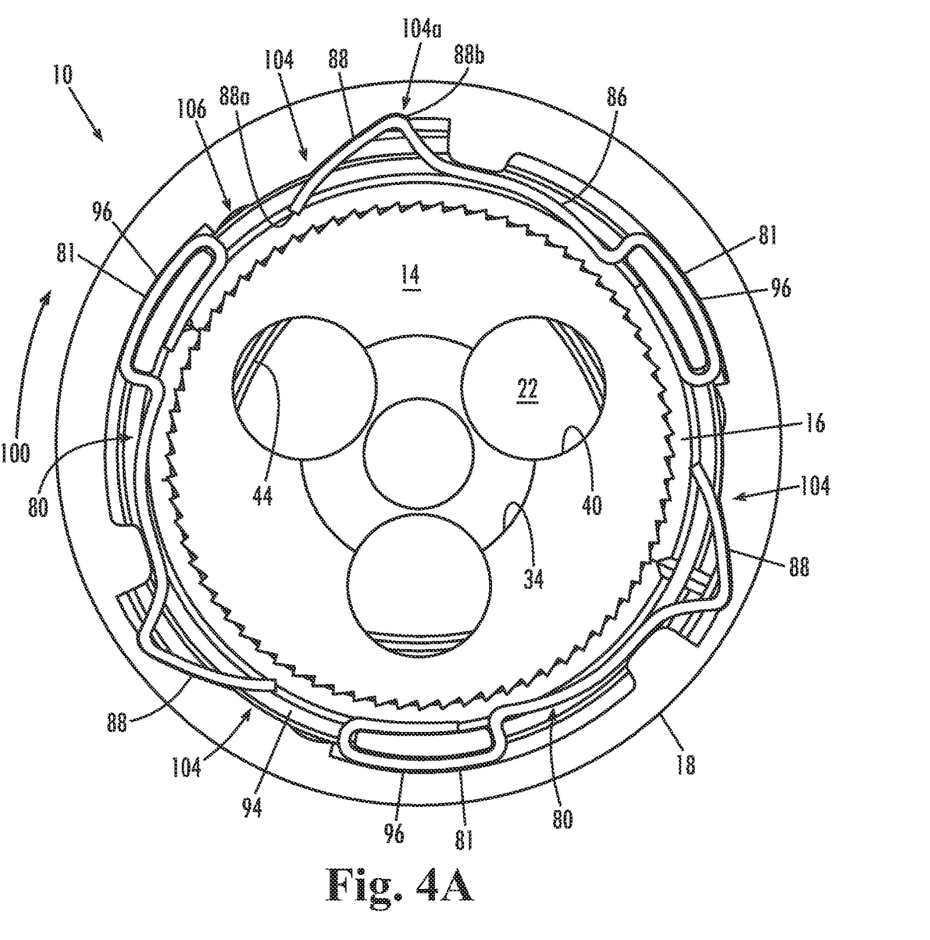
FIG. 4A is a cross-sectional view of the chuck as shown in FIG. 2, taken along line 4-4, with the chuck in the unlocked position.
Figure 4B:
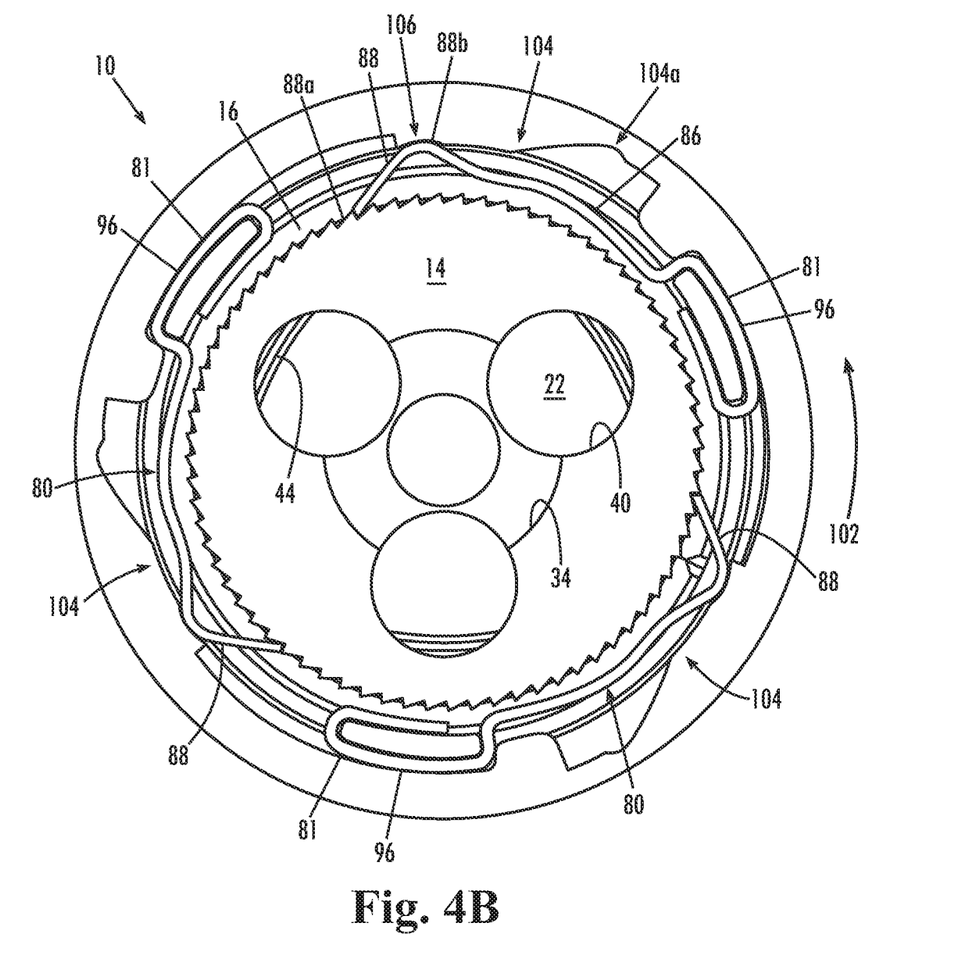
FIG. 4B is a cross sectional view of the chuck as shown in FIG. 2, taken along line 4-4, with the chuck in the locked position.

Body 14 also includes a ratchet in the form of an annular array of locking teeth 84. In the illustrated embodiment, the array is formed by a plurality of sawtooth shaped teeth 84 disposed about an outer circumferential surface of body 14 forward of annular groove 57. Referring additionally to FIGS. 4A and 4B, each tooth 84 has a first side with a slope approaching 90°, whereas the second side of each tooth 84 has a lesser slope. Each locking pawl 80 is deflectable and the locking tip of each engagement portion 88 is generally disposed in alignment with the slope of the second sides of the teeth. Thus, rotation of nut 16 and, therefore, locking pawl 80 in a direction 100 (closing direction) with respect to body 14 moves locking tips 88a of engagement portions 88 repeatedly over teeth 84, causing a clicking sound as they fall against each subsequent second side of each tooth 84. This configuration of teeth 84 and locking pawls 80, however, prevents the rotation of nut 16 in an opposite direction 102 (opening direction). Application of rotational force to the nut 16 in this direction forces locking tips 88a into the steep-sloped first sides of teeth 84. When engaged, locking tips 88a of the locking pawls engagement portions 88 are generally perpendicular to the first sides and, as such, the locking pawls 80 do not deflect to permit rotation.

As previously noted, engagement portion 88 of each locking pawl 80 includes a biasing cam 88b whereas the inner surface of sleeve 18 defines a plurality of camming surfaces 104, each one including a first recess, or base 104a, and a second recess, or lock recess 106, disposed at its opposing ends. More specifically, a camming surface 104 is present for each locking pawl 80. Depending on the rotational position of front sleeve 18 with respect to nut 16, each biasing cam 88b is received either at a base 104a of a corresponding cam surface 104 or its lock recess 106. Base 104a of each camming surface 104 is the radially outermost portion of the camming surface and is where the biasing cam 88b of the corresponding lock pawl 80 is received when the chuck is in the unlocked position (FIG. 4A), as discussed in greater detail below.

FIG. 4A illustrates the disposition of lock pawls 80 when front sleeve 18 is in a first of two positions with respect to nut 16, while FIG. 4B illustrates these components when front sleeve 18 is in a second position with respect to the nut. Referring additionally to FIG. 6, each drive dog 96 is disposed against or adjacent a side 108 of recess 62 in which it is received when sleeve 18 is in the second, or locked, position with respect to the nut. As well, each biasing cam 88b is received in a corresponding lock recess 106. Accordingly, engagement portion 88 of each locking pawl 80 is forced inwardly until its locking tip 88a engages ratchet teeth 84, meaning nut retainer 90 and, therefore, nut 16 can rotate only in closing direction 100 with respect to body 14.

Figure 5A:
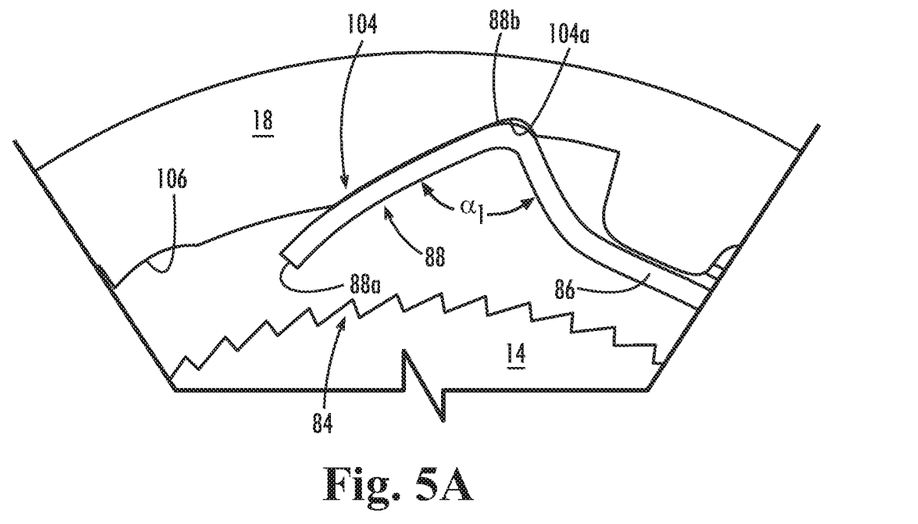
FIG. 5A is an enlarged view of a portion of the chuck as shown in FIG. 4A, in the area indicated by reference numeral 5A.

Referring now to FIGS. 4A, 5A and 6, when sleeve 18 moves in opening direction 102 with respect to the chuck body, each biasing cam 88b rides out of the respective lock recess 106 and along cam surface 104 until reaching its base 104a, in the direction indicated by arrow 110. This allows each deflectable locking pawl 80 to return to its normal, outwardly biased position, thereby disengaging locking tips 88a of the locking pawls' engagement portions 88 from ratchet teeth 84. Thus, nut 16 is free to rotate with respect to chuck body 14. Continued rotation of front sleeve 18 in opening direction 102 subsequently causes the rotation of nut 16 in the opening direction, thereby causing each jaw 22 to be withdrawn in its corresponding passageway 40 into the chuck body.

As described in more detail below, when front sleeve 18 rotates in opening direction 102 so that locking pawls 80 move from the positions shown in FIG. 4B to the position shown in FIG. 4A, drive dogs 96 of nut retainer 90 move within recesses 62 of front sleeve (FIG. 6) so that each drive dog 96 is against or immediately adjacent to a side 110 of the corresponding recess.

Figure 5B:
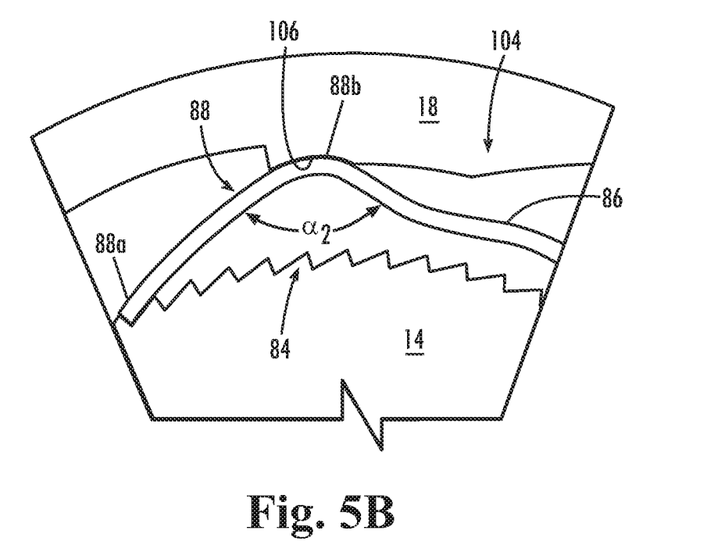
FIG. 5B is an enlarged view of a portion of the chuck as shown in FIG. 4B, in the area indicated by reference numeral 5B.

In operation, and referring additionally to FIGS. 4B and 5B, recesses 62 of front sleeve 18 receive drive dogs 96 when the chuck is between fully opened and fully closed positions so that the drive dogs 96 are adjacent recess sides 110. Locking pawls 80 are disposed with respect to front sleeve 18 so that biasing cams 88b are received by respective camming surface bases 104a. That is, front sleeve 18 is in the first, unlocked position with respect to the nut. In this position, biasing cams 88b and camming surface bases 104a rotationally fix nut retainer 90 to front sleeve 18. Since nut retainer 90 is rotationally fixed to nut 16 by a press-fit, an operator rotating front sleeve 18 rotationally drives the nut through nut retainer 90, thereby opening or closing the jaws. When the operator rotates the sleeve/nut retainer/nut in the closing direction (indicated by arrow 100) to the point that the jaws tighten onto a tool shank, the nut is urged rearward up the jaw threads, thereby pushing the nut against bearing elements 74, bearing washer 70, and thrust ring 46.

The wedge between the nut threads and jaw threads increasingly resists the rotation of the nut. When the operator continues to rotate front sleeve 18 in closing direction 100, and the resistance of nut 16 to being rotated overcomes the hold between front sleeve 18 and nut retainer 90 that is provided by biasing cams 88b being received in the camming surface bases 104a, front sleeve 18 rotates with respect to nut retainer 90 and, therefore, nut 16. This moves drive dogs 96 from sides 110 of recesses 62 to sides 108. Simultaneously, camming surfaces 104 rotate relative to biasing cams 88b in direction 110 so that the biasing cams leave their respective bases 104a and ride up on the camming surfaces, thereby biasing engagement portions 88 of locking pawls 80 inwardly. With continued rotation of sleeve 18, locking tips 88a of the pawls engage ratchet teeth 84 of the annular array, as shown in FIGS. 4B and 5B. At this point, nut 16 is rotationally locked to chuck body 14, against rotation in opening direction 102 of the chuck. Since the rotation of the nut with respect to the body is necessary to open the chuck, this configuration of lock pawls 80 relative to ratchet teeth 84 resists inadvertent opening during use.

In the preferred embodiment shown, not only do locking pawls 80 rotationally lock nut 16 to chuck body 14 when engaging locking teeth 84, each locking pawl is configured to exert force in the closing direction on nut 16 when engaging locking teeth 84. More specifically, as best seen in FIGS. 5A and 5B, when front sleeve 18 is in the first, unlocked position with respect to nut 16, biasing cam 88b of each locking pawl 80 is received in a corresponding base 104a, and distal end 88 of each locking pawl 80 is in an at-rest, unbiased position. In the at-rest position, the two "legs" of each engagement portion 88 define a first angle ($\alpha^1$). However, as front sleeve 18 is rotated to the second, locked position, each engagement portion 88 is biased radially inwardly until each locking tip 88a engages locking teeth 84, as previously noted.

Continued rotation of front sleeve 18 with respect to nut 16 continues until the second, locked position is reached and biasing cam 88b of each locking pawl 80 is received in the corresponding lock recess 106. Continued rotation of front sleeve 18 relative to nut 16 causes each engagement portion 88 to become compressed between the corresponding camming surface 104 and locking teeth 84 of chuck body 14. This compression causes the curvature of each engagement portion 88a to be lessened as the legs of each engagement portion 88a move farther apart. As shown in FIG. 5B, when front sleeve reaches the second, locked position, the legs of each engagement portion 88a define a second angle ($\alpha^2$), that is greater than the first angle defined by the legs of each engagement portion 88 when in the unbiased position. As such, each engagement portion, and subsequently each locking pawl 80, becomes elongated as compared to its non-compressed state. Because each locking pawl is non-rotatably fixed to nut 16 by way of nut retainer 90, this elongation of the locking pawl necessarily means that an additional biasing force in the closing direction is exerted on nut 16, thereby enhancing the overall amount of force that helps prevent the inadvertent opening, or loosening, of the chuck.

Locking pawls 80, and therefore nut 16, may, however, still rotate with respect to locking teeth 84, and therefore body 14, in closing direction 100 of the chuck. When the user rotates front sleeve 18, the sleeve drives nut 16 through drive dogs 96 which are positioned against groove sides 108. This continues to tighten the chuck and, as described above, produces a clicking sound to notify the operator that the chuck is in a fully tightened position.

To open the chuck, the operator rotates front sleeve 18 in opening direction 102. Front sleeve 18 transfers this torque to nut retainer 90 at the engagement of biasing cams 88b in lock recesses 106. Because locking pawls 80 engage ratchet teeth 84, which are rotationally fixed to the body, nut retainer 90 and nut 16 cannot rotate with the front sleeve. Thus, upon application of sufficient torque in the opening direction 102, front sleeve 18 rotates with respect to the nut retainer and the nut, thereby moving biasing cams 88b out of lock recesses 106. Continued rotation of front sleeve 18 in opening direction 102 causes biasing cams 88b to slide along their respective camming surface 104 and back into bases 104a, thereby disengaging locking tips 88a of respective locking pawls 88 from ratchet teeth 84. As this occurs, drive dogs 96 move from sides 108 to sides 110 of recesses 62. Thus, the front sleeve moves to the first position with respect to the nut, as shown in FIG. 4A, and the nut retainer and nut are free to rotate with respect to the chuck body. Accordingly, further rotation of front sleeve 18 in the opening direction moves jaws 22 away from the chuck axis, thereby opening the chuck.

Figure 7A:
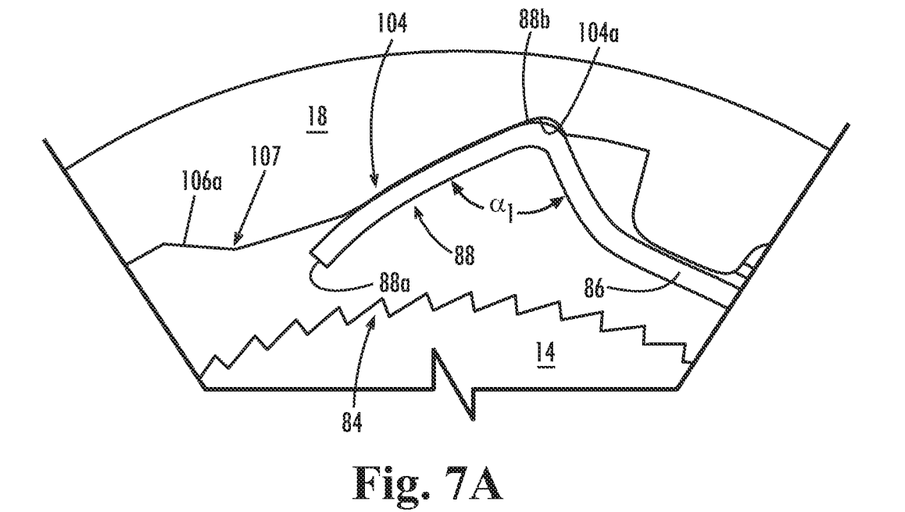
FIGS. 7A and 7B are enlarged, partial cross-sectional views of an alternate embodiment of a chuck in accordance with the present disclosure.
Figure 7B:
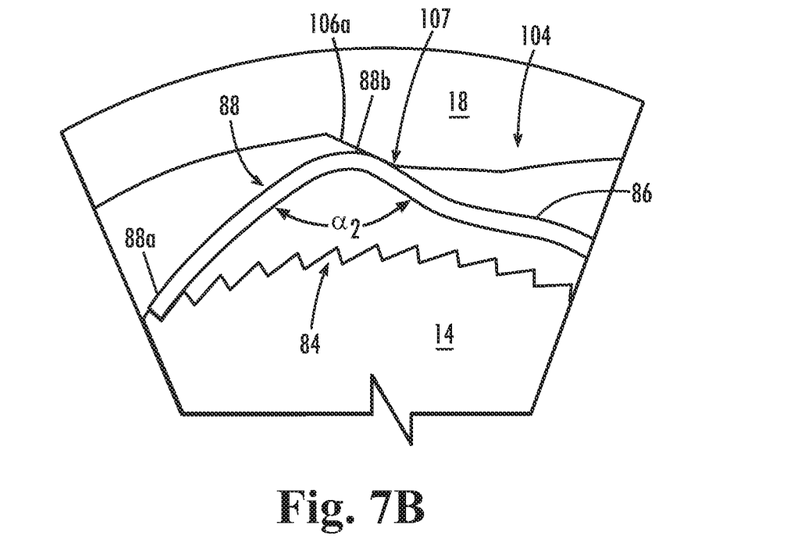

Referring now to FIGS. 7A and 7B, a chuck in accordance with an alternate embodiment of the present disclosure is shown. The chuck functions in substantially the same manner as the previously discussed first embodiment and, as such, a full description of the chuck's construction and operation is not required here. Similar elements between the two chucks received the same reference numerals, and only those elements that differ have been given different referencing numerals. In short, the embodiment shown in FIGS. 7A and 7B differs from the first embodiment in that lock recess 106 of the first embodiment has been replaced with a lock surface 106a in the present embodiment. FIG. 7A illustrates the disposition of lock pawls 80 when front sleeve 18 of the second embodiment is in a first of two positions with respect to nut 16, while FIG. 7B illustrates these components when front sleeve 18 is in a second position with respect to the nut.

Referring additionally to FIG. 6, each drive dog 96 is disposed against or adjacent a side 108 of a recess 62 in which it is received when sleeve 18 is in the second position with respect to the nut. As well, each biasing cam 88b is received adjacent a corresponding lock surface 106a. Accordingly, engagement portion 88 of each locking pawl is forced inwardly until its locking tip 88a engages locking teeth 84, meaning nut retainer 90 and, therefore, nut 16 can rotate only in closing direction 100 with respect to body 14. Note, an innermost corner 107 of lock surface 106a extends radially inwardly beyond biasing cam 88b of the respective engagement portion 88. As such, as locking pawl 80 attempts to return to its radially outward, unbiased position, biasing cam 88b slides outwardly along lock surface 106a until further movement along the surface is no longer possible. Note, in the locked position, rotation of sleeve 18 in locking direction 100 (FIG. 4A) relative to the locking pawls is limited by the abutment of drive dogs 96 against sides 108 of the corresponding recesses 62. In this configuration, not only is engagement portion 88 compressed between lock surface 106a and locking teeth 84, thereby exerting force on nut 16 in closing direction 100 by way of the nut retainer, the radially outward force exerted by biasing cam 88b on lock surface 106a means that each engagement portion 88 is exerting force on sleeve 18 in closing direction 100 as well. In short, in the second embodiment, locking pawls 80 exert force on both the nut and the front sleeve in the closing direction, thereby enhancing the operation of the disclosed locking feature.

It should be understood that the embodiment illustrated in the figures is provided by way of explanation only and that the present invention may be realized in any suitable form. For example, the pawls and ratchet may be formed in any suitable configuration. As well, although the embodiments disclosed herein include three locking pawls, alternate embodiments may include more than three locking pawls and as few as one. The present invention may be used in a variety of configurations whereby a bearing having a ratchet configuration is disposed between a sleeve, for example a nut or other suitable configuration, and the chuck body.

While one or more preferred embodiments of the present invention have been described above, it should be understood that any and all equivalent realizations of the present invention are included within the scope and spirit thereof. Thus, the depicted embodiment(s) are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A chuck for use with a manual or powered driver having a rotatable drive shaft, the chuck comprising:
    a generally cylindrical body having a nose section, a tail section and a center axis, the tail section being configured to rotate with the drive shaft and the nose section having an axial bore formed therein and a plurality of passageways formed therethrough and intersecting the axial bore;
    a plurality of jaws movably disposed in the passageways;
    a nut rotatably mounted about the body and in operative communication with the jaws so that rotation of the nut in a closing direction moves the jaws toward the center axis of the body and rotation of the nut in an opening direction moves the jaws away from the center axis;
    a generally cylindrical sleeve rotatably mounted about the body, the sleeve including an inner surface defining a first recess, a second recess, and a drive slot, the sleeve being in operative communication with a drive dog that is slidably received in the drive slot and rotates with the nut so that the sleeve rotationally drives the nut via the drive dog but the sleeve is rotatable with respect to the nut between a first rotational position of the sleeve where the drive dog is adjacent a first side of the drive slot and a second rotational position of the sleeve where the drive dog is adjacent a second side of the drive slot;
    an annular array of locking teeth non-rotatably fixed to the body; and
    a locking pawl including a mounting portion and an engagement portion, the mounting portion being non-rotatably fixed to the nut in a fixed position by being mounted on the drive dog such that the locking pawl rotates with the nut, and the engagement portion having a biasing cam, and a first leg and a second leg extending radially inwardly therefrom so that the first leg and the second leg define an acute angle therebetween and the engagement portion defines a convex outer surface and a concave inner surface disposed in facing relationship with the locking teeth,
    the engagement portion being radially movable with respect to the body, the engagement portion and the locking teeth being configured so that when the engagement portion engages the locking teeth, the engagement portion and the locking teeth prevent the nut from rotating in the opening direction with respect to the body,
    wherein the biasing cam of the engagement portion is received in the first recess and is disengaged from the locking teeth so that the first leg and the second leg define a first acute angle value therebetween when the sleeve is in the first rotational position, and the biasing cam of the engagement portion is received in the second recess and engages the locking teeth so that the first leg and the second leg define a second acute angle value therebetween when the sleeve is in the second rotational position, the engagement portion being compressed between the locking teeth and the second recess in the second rotational position so that an amount of force is exerted on the nut in the closing direction by the engagement portion, and the second acute angle value is greater than the first acute angle value.

2. The chuck as in claim 1, wherein the engagement portion of the locking pawl has a first length when the sleeve is in the first rotational position and a second length when the sleeve is in the second rotational position, and the second length is greater than the first length.

3. The chuck as in claim 1, wherein the locking pawl has a first length when the sleeve is in the first rotational position and a second length when the sleeve is in the second rotational position, and the second length is greater than the first length.

4. The chuck as in claim 1, wherein the sleeve further comprises a camming surface disposed between the first recess and the second recess.

5. The chuck as in claim 4, wherein the camming surface biases the engagement portion of the locking pawl radially inwardly as the engagement portion moves from the first recess to the second recess.

6. The chuck as in claim 1, wherein the engagement portion of the locking pawl further comprises a locking tip, and the locking tip and the locking teeth are configured so that when the locking tip engages the locking teeth, the locking tip and locking teeth permit the nut to rotate in the closing direction with respect to the body.

7. The chuck as in claim 1, wherein the locking teeth are disposed on the body axially forward of the nut.

8. The chuck as in claim 1, wherein the locking teeth are formed directly in the body.

9. The chuck as in claim 1, further comprising a nut retainer including a cylindrical body, wherein the nut retainer further comprises the drive dog extending axially forward therefrom.

10. A chuck for use with a manual or powered driver having a rotatable drive shaft, the chuck comprising:
    a generally cylindrical body having a nose section, a tail section and a center axis, the tail section being configured to rotate with the drive shaft and the nose section having an axial bore formed therein and a plurality of passageways formed therethrough and intersecting the axial bore;
    a plurality of jaws movably disposed in the passageways;
    a nut rotatably mounted about the body and in operative communication with the jaws so that rotation of the nut in a closing direction moves the jaws toward the center axis of the body and rotation of the nut in an opening direction moves the jaws away from the center axis;
    a generally cylindrical sleeve rotatably mounted about the body, the sleeve including an inner surface defining a camming surface and a drive slot, the sleeve being in operative communication with a drive dog that is slidably received in the drive slot and rotates with the nut so that the sleeve rotationally drives the nut via the drive dog but the sleeve is rotatable with respect to the nut between a first rotational position of the sleeve where the drive dog is adjacent a first side of the drive slot and a second rotational position of the sleeve where the drive dog is adjacent a second side of the drive slot;

an annular array of locking teeth non-rotatably fixed to the body; and a locking pawl including a mounting portion and an engagement portion, the mounting portion being non-rotatably fixed to the nut in a fixed position by being mounted on the drive dog such that the locking pawl rotates with the nut, the locking pawl being deflectable and the engagement portion having a biasing cam, and a first leg and a second leg extending radially inwardly therefrom so that the first leg and the second leg define an acute angle therebetween and the engagement portion is curved, the engagement portion being radially movable with respect to the body, the engagement portion and the locking teeth being configured so that when the engagement portion engages the locking teeth, the engagement portion and the locking teeth prevent the nut from rotating in the opening direction with respect to the body, wherein the locking pawl has a first length when the first leg and the second leg define a first acute angle value therebetween and the sleeve is in the first rotational position, and a second length when the first leg and the second leg define a second acute angle value therebetween and the sleeve is in the second rotational position, the second length being greater than the first length, and the second acute angle value being greater than the first acute angle value, and wherein the camming surface biases the engagement portion of the locking pawl radially inwardly as the sleeve moves from the first rotational position to the second rotational position with respect to the nut.

11. The chuck as in claim 10, wherein the engagement portion is disengaged from the locking teeth when the sleeve is in the first rotational position and the engagement portion engages the locking teeth when the sleeve is in the second rotational position, the engagement portion being compressed between the locking teeth and the camming surface in the second rotational position so that an amount of force is exerted on the nut in the closing direction by the engagement portion.

12. The chuck as in claim 10, wherein the inner surface of the sleeve further comprises a first recess and a second recess disposed at opposing ends of the camming surface.

13. The chuck as in claim 12, wherein the biasing cam of the engagement portion of the locking pawl is received in the first recess when the sleeve is in the first rotational position and in the second recess when the sleeve is in the second rotational position.

14. The chuck as in claim 10, wherein the engagement portion of the locking pawl further comprises a locking tip, and the locking tip and the locking teeth are configured so that when the locking tip engages the locking teeth, the locking tip and locking teeth permit the nut to rotate in the closing direction with respect to the body.

15. The chuck as in claim 10, wherein the locking teeth are disposed on the body axially forward of the nut.

16. The chuck as in claim 10, further comprising a nut retainer including a cylindrical body, wherein the nut retainer further comprises the drive dog extending axially forward therefrom.

17. The chuck as in claim 10, wherein the engagement portion of the locking pawl exerts an amount of force on the sleeve in the closing direction.

18. A chuck for use with a manual or powered driver having a rotatable drive shaft, the chuck comprising:

a body having a center axis and configured to rotate with the drive shaft;

a plurality of jaws movably disposed in passageways of the body;

a nut rotatably mounted about the body and in operative communication with the jaws so that rotation of the nut in a closing direction moves the jaws toward the center axis of the body and rotation of the nut in an opening direction moves the jaws away from the center axis;

a sleeve rotatably mounted about the body, the sleeve including an inner surface defining a camming surface and a drive slot, the camming surface comprising a first recess and a second recess, the sleeve being in operative communication with a drive dog that is slidably received in the drive slot and rotates with the nut such that the sleeve rotationally drives the nut via the drive dog, wherein the sleeve is rotatable with respect to the nut between a first rotational position of the sleeve where the drive dog is adjacent a first side of the drive slot and a second rotational position of the sleeve where the drive dog is adjacent a second side of the drive slot;

an annular array of locking teeth fixed to the body; and a locking pawl including a mounting portion and an engagement portion, the mounting portion being mounted on the drive dog such that the locking pawl rotates with the nut, the engagement portion comprising a biasing cam configured to slide into operative communication with the camming surface of the sleeve as the sleeve moves from the first rotational position to the second rotational position, the engagement portion further comprising a first leg and a second leg extending radially inwardly therefrom and the engagement portion defines a convex outer surface and a concave inner surface disposed in facing relationship with the locking teeth;

wherein the biasing cam of the engagement portion is received in the first recess of the camming surface and the engagement portion is disengaged from the locking teeth such that the first leg and second leg define a first acute angle therebetween when the sleeve is in the first rotational position; and wherein the biasing cam of the engagement portion is received in the second recess of the camming surface and the engagement portion is engaged with the locking teeth such that the first leg and the second leg define a second acute angle therebetween when the sleeve is in the second rotational position, the engagement portion being compressed between the locking teeth and the second recess in the second rotational position so that an amount of force is exerted on the nut in the closing direction by the engagement portion, wherein the second acute angle is larger than the first acute angle.

* * * * *